United States Patent [19]
Amano

[11] Patent Number: 5,777,668
[45] Date of Patent: Jul. 7, 1998

[54] FURNACE MONITORING CAMERA WITH PIVOTING ZOOM LENS

[75] Inventor: Hiro Amano, Kisarazu, Japan

[73] Assignee: Amano & Associates Incorporated, Tokyo, Japan

[21] Appl. No.: 687,769

[22] Filed: Jul. 26, 1996

Related U.S. Application Data

[63] Continuation of Ser. No. 295,397, Aug. 25, 1994, abandoned.

[51] Int. Cl.[6] .................................................. H04N 7/18
[52] U.S. Cl. .............................................................. 348/83
[58] Field of Search ............................ 348/82, 83, 65, 348/61, 151, 143, 39, 38, 37, 36; H04N 7/18

[56] References Cited

U.S. PATENT DOCUMENTS

| | | | |
|---|---|---|---|
| 3,021,385 | 2/1962 | Summerhayes, Jr. et al. | 348/83 |
| 4,398,811 | 8/1983 | Nishioka et al. | 350/506 |
| 4,432,286 | 2/1984 | Witte | 110/193 |
| 4,855,823 | 8/1989 | Struhs et al. | 348/151 |
| 4,901,146 | 2/1990 | Strahs et al. | 348/151 |
| 5,049,988 | 9/1991 | Sefton et al. | 348/143 |
| 5,313,306 | 5/1994 | Kuban et al. | 348/65 |
| 5,394,209 | 2/1995 | Stiepel et al. | 348/151 |
| 5,438,265 | 8/1995 | Eslambolchi et al. | 324/326 |

FOREIGN PATENT DOCUMENTS

| | | |
|---|---|---|
| 0540307 | 5/1993 | European Pat. Off. |
| 5-88094 | 4/1993 | Japan |
| 2203312 | 10/1988 | United Kingdom |
| 2267762 | 12/1993 | United Kingdom |

OTHER PUBLICATIONS

Patent Abstracts of Japan, vol. 17, No. 428 (P-1588) 9 Aug. 1993 & JP-A-05 088 094, 9 Apr. 1993.
Patent Abstracts of Japan, vol. 10, No. 190 (P-474) 4 Jul. 1986 & JP-A-61 036 730, 21 Feb. 1986.

Primary Examiner—Bryan S. Tung
Attorney, Agent, or Firm—Birch, Stewart, Kolasch & Birch, LLP

[57] ABSTRACT

A furnace throat monitoring camera monitors the throat of a blast furnace through an opening defined in a surrounding wall of the throat. The furnace throat monitoring camera includes a wide-angle lens system for producing an optical image representing a condition in the throat, a zoom lens system for varying a size of the optical image produced by the wide-angle lens system, and an imaging device for capturing the optical image varied in size by the zoom lens system. The zoom lens system and the imaging device can be tilted in unison with each other by a tilting unit to observe any area of the optical image produced by the wide-angle lens system.

10 Claims, 5 Drawing Sheets

FURNACE MONITORING CAMERA WITH PIVOTING ZOOM LENS

This application is a continuation of application Ser. No. 08/295,397 filed on Aug. 25, 1994, now abandoned.

BACKGROUND OF THE INVENTION

1. Field of the Invention

The present invention relates to a monitoring camera for monitoring the interior of a closed space surrounded by a surrounding wall through an opening defined in the surrounding wall, and more particularly to a monitoring camera for monitoring various conditions including the grain size and distribution of raw material, gas flow, etc. in the throat of a blast furnace for producing pig iron from iron ore.

2. Description of the Related Art

There has been known a furnace throat monitoring camera for monitoring various conditions including the grain size and distribution of raw material, gas flow, etc. in the throat of a blast furnace for producing pig iron from iron ore.

Generally, a blast furnace for producing iron from iron ore has a downwardly tapering bosh in its lower portion and a cylindrical shaft extending upwardly from the bosh into an upwardly tapering throat having a central inlet which opens upwardly. The throat is connected to a gas retriever disposed on the top of the throat. As iron ore and coke charged from the throat descend in the shaft, they are reduced and melted by a reducing gas which is produced at high temperature in the bosh, and separated into slag and pig iron.

The iron ore and the coke are charged into the shaft in a predetermined planned stack pattern such that those of a predetermined grain size are placed in position in the shaft so as to form a conical recess with a center being the lowest point in the throat. A stack pattern suitable for the production of pig iron is selected depending on the blast furnace used.

To form the predetermined stack pattern, the iron ore and the coke are charged into the shaft according to a prescribed charging pattern by a charging device such as a swingable chute disposed above the throat or a bell or the like which is vertically movable. However, it is difficult to keep the stack pattern as planned because the iron ore and the coke which are charged roll toward the center of the conical recess and the reducing gas blows upwardly from around the iron ore and the coke.

The furnace throat monitoring camera is installed to monitor the grain and distribution of the iron ore and the coke in the throat of the blast furnace and the reducing gas blowup. If an undesirable change occurs in the grain and distribution of the iron ore and the coke in the throat or a blowup of the reducing gas is produced, then the furnace throat monitoring camera can accurately detect the position of such an undesirable change or a blowup. Iron ore and coke can then be charged into the detected position by the charging device, allowing the stack pattern to be easily maintained.

FIG. 4 of the accompanying drawings shows a conventional furnace throat monitoring camera 31 for monitoring conditions of a stack pattern 5 in a throat 2 through an opening 4 defined in a surrounding wall 3 of the throat 2. The furnace throat monitoring camera 31 comprises a lens system 32 and an imaging device 33 which are positioned behind the opening 4.

The furnace throat monitoring camera 31 shown in FIG. 4 is required to be spaced a considerable distance behind the opening 4 in order to gain a wide field of view. However, it has heretofore been unable for the furnace throat monitoring camera 31 to image a sufficient area of the stack pattern 5 within its field of view. If the opening 4 is increased in size in order to widen the optical path of the lens system 32, then the surface of a shielding glass panel installed behind the opening 4 or the surface of the lens system 32 tends to be smeared by particles of the iron ore and the coke which are stirred upwardly by the reducing gas in the throat 2, thereby preventing the furnace throat monitoring camera 31 from monitoring the interior of the throat 2 clearly at all times.

To solve the above problem, there has been proposed a furnace throat monitoring camera 41 shown in FIG. 5 of the accompanying drawings as disclosed in Japanese laid-open patent publication No. 5-88094. The furnace throat monitoring camera 41 monitors a stack pattern 5 in a throat 2 through an opening 4 which is composed of a small hole defined in a surrounding wall 3 of the throat 2. The furnace throat monitoring camera 41 comprises a wide-angle lens system 42 of short focus and an imaging device 43 which are disposed behind the opening 4. The opening 4 is positioned on a front focal point on the optical axis of the wide-angle lens system 42.

The furnace throat monitoring camera 41 can image almost an entire area of the stack pattern 5 within its field of view because of the wide-angle lens system 42. Since the wide-angle lens system 42 has a short focal length and can be positioned closely behind the opening 4, the overall size of the furnace throat monitoring camera 41 may be reduced.

The opening 4 is located on the front focal point where light having passed through compound lenses of the wide-angle lens system 42 is converged. Therefore, even though the opening 4 is composed of a small hole, it can maintain a sufficient optical path of the wide-angle lens system 42. The small hole is effective to prevent particles in the throat 2 from finding their way into the furnace throat monitoring camera 41, making it less liable for such particles to smear the wide-angle lens system 42. Therefore, the furnace throat monitoring camera 41 can monitor the interior of the throat 2 clearly at all times, and can be supervised and serviced with ease.

The field of view of the furnace throat monitoring camera 41 is illuminated by an illuminating unit 44 which is disposed above the surrounding wall 3.

For analyzing the charging pattern for the iron ore and the coke to keep the stack pattern 5 optimum or make the stack pattern 4 more preferable, it is necessary to monitor the stack pattern 5 in a wide range and also to recognize partial details of the grain size and distribution of the iron ore and the coke and the blowup of the reducing gas. To meet such a requirement, a zoom lens system 45, indicated by the imaginary line in FIG. 5, may be positioned behind the wide-angle lens system 42 on the same optical axis for movement in unison with the wide-angle lens system 42, so that an enlarged scale of an image produced by the wide-angle lens system 42 can be observed by the zoom lens system 45.

However, inasmuch as the small hole 4, the wide-angle lens system 42, the zoom lens system 45 are aligned on the same optical axis, the zoom lens system 45 is capable of increasing or reducing only the size of an image around the optical axis, but not the size of an image around any desired position on an image produced by the wide-angle lens system 42. Stated otherwise, the zoom lens system 45 is unable to enlarge the peripheral field edge of an image produced by the wide-angle lens system 42.

Consequently, the furnace throat monitoring camera 41 with the zoom lens system 45 can monitor only a central area of the stack pattern 5, but not details of the grain size and distribution of the iron ore and the coke and the blowup of the reducing gas outside of the central area of the stack pattern 5.

SUMMARY OF THE INVENTION

It is therefore an object of the present invention to provide a monitoring camera capable of imaging a wide range in an optical field of view thereof, and of enlarging and contracting an image around any desired position over the optical field of view in its entirety.

Still another object of the present invention is to provide a monitoring camera which allows a stack pattern to be maintained easily and a charging pattern of iron ore and coke that are charged into the throat of a blast furnace for producing pig iron from iron ore to be analyzed easily.

To achieve the above objects, there is provided in accordance with the present invention a monitoring camera for monitoring a condition on a side of a wall through an opening defined in the wall, comprising a wide-angle lens system for producing an optical image, a zoom lens system for varying a size of the optical image produced by the wide-angle lens system, and an imaging device for capturing the optical image varied in size by the zoom lens system, and moving means for moving the zoom lens system and the imaging device in unison with each other to observe any area of the optical image produced by the wide-angle lens system.

Normally, an overall optical image of the side of the wall, which is produced by the wide-angle lens system, is observed through the imaging device. If there is any particular area of the optical image which is to be observed in greater detail, then the zoom lens system and the imaging device are moved by the moving means, and an enlarged optical image of that area is produced by the zoom lens system for detailed observation of the area.

The moving means moves the zoom lens system and the imaging device to orient an optical axis of the zoom lens system in any direction around an optical axis of the wide-angle lens system for allowing the observer to easily perceive an area to be observed. The moving means may move the zoom lens system and the imaging device vertically and horizontally parallel to the optical axis of the wide-angle lens system, or may tilt the zoom lens system and the imaging device in any direction to orient the optical axis of the zoom lens system in any direction around the optical axis of the wide-angle lens system.

The opening is positioned forwardly of a front focal point of the wide-angle lens system within a range having a length corresponding to a minimum width of the opening to obtain a clear image. If the distance between the opening and the wide-angle lens system is shorter than the front focal length of the wide-angle lens system, then the field of view is narrowed. If the distance between the opening and the wide-angle lens system is longer than the sum of the front focal length of the wide-angle lens system and the minimum width of the opening, then the produced image is blurred. If a shielding glass panel (described later on) is present on the optical axis of the wide-angle lens system, then the front focal length of the wide-angle lens system is corrected by adding the product of the thickness of the shielding glass panel and the refractive index thereof.

When the opening is positioned as described above, incident light to be applied to the wide-angle lens system is converged in the opening or in a position in front of the opening. Therefore, the opening may be a small hole large enough to provide an optical path for the incident light to be applied to the wide-angle lens system, and does not need to be unduly large. The opening in the form of a small hole is effective to reduce particles entering the monitoring camera, and is highly advantageous when the monitoring camera is used to monitor an area where many particles are produced, such as the throat of a blast furnace.

Since the small hole serves as an aperture for the wide-angle lens system, any image produced by the wide-angle lens system is sharp. To allow the small hole to function as an aperture, the opening as the small hole is positioned such that when the wide-angle lens system suffers small aberrations, the distance from the wide-angle lens system is slightly longer than the front focal length thereof, and when the wide-angle lens system suffers large aberrations, the distance from the wide-angle lens system is slightly shorter than the sum of the front focal length thereof and the minimum width of the opening, i.e., the diameter of the small hole.

The zoom lens system should preferably be combined with a close-up lens having a short focal length. If a sharply focused image were to be formed on the back focal point of the wide-angle lens system by the zoom lens system, then the closest imaging distance of the zoom lens system would have to be provided in front of the zoom lens system, resulting an unduly long device configuration. The close-up lens disposed in front of the zoom lens system converts rays of light into parallel rays of light which are then applied to the zoom lens system. Accordingly, the closest imaging distance of the zoom lens system may be shortened, thus reducing the size of the monitoring camera.

The monitoring camera further includes illuminating means for illuminating the side of the wall.

The monitoring camera further includes a cylindrical attachment having one end surrounding the opening, and an outer sleeve, the wide-angle lens system, the zoom lens system, and the imaging device being housed in the outer sleeve, the outer sleeve being fitted in an opposite end of the cylindrical attachment closely to the wide-angle lens system. Since the wide-angle lens system, the zoom lens system, and the imaging device are housed altogether in the outer sleeve, they can be serviced with ease. Preferably, a shielding glass panel is mounted on an end of the outer sleeve near the cylindrical attachment or an end of the cylindrical attachment near the outer sleeve, for isolating the wide-angle lens system, the zoom lens system, and the imaging device from a space outside of the outer sleeve thereby to prevent them from being smeared with particles.

The wide-angle lens system has an angle of view ranging from 60° to 80°, and the zoom lens system has a zoom ratio ranging from 4 to 15.

The monitoring camera is suitable for use in combination with a blast furnace for producing pig iron from iron ore, for observing a throat of the blast furnace through an opening defined in a surrounding wall of the throat. When the throat of the blast furnace is observed by the monitoring camera, an optical image of the entire throat can be obtained by the wide-angle lens system. If the observed optical image contains an improper stack pattern of charged materials or a blowup of a reducing gas, then the zoom lens system and the imaging device are moved by the moving means to orient the optical axis of the zoom lens toward an area which is to be obtained in greater detail. Since the zoom lens system produces an enlarged optical image of the area to be obtained in greater detail, the area can be observed in greater detail by the observer to perceive the stack pattern representing the grain size and distribution of iron ore and coke in the throat and also the reducing gas blowup.

In the case where the monitoring camera is used to monitor the throat of the blast furnace, the monitoring camera should preferably have an inert gas supply means for introducing an inert gas into the cylindrical attachment and discharging at least part of the inert gas through the opening into the throat. The throat of the blast furnace is filled with particles of the iron ore and coke which are stirred up by gas flows. If such particles entered the monitoring camera through the opening, they would be deposited on the shielding glass panel, presenting an obstacle to the monitoring of the throat.

The entry of particles from the throat into the monitoring camera is reduced by the opening which is in the form of a small hole as described above. However, very fine particles still tend to flow from the opening into the monitoring camera, smearing the shielding glass panel. The inert gas flow from the opening into the throat is capable of preventing such very fine particles from entering the monitoring camera.

The cylindrical attachment has a partition dividing an interior space thereof into a first space defined between the opening and the partition and a second space defined between the partition and the outer sleeve, the partition having an optical path for the wide-angle lens system and the zoom lens system, the inert gas supply means comprising means for introducing the inert gas under a higher pressure into the first space and then discharging the inert gas through the opening into the throat, and passing the inert gas under a lower pressure through the second space. The inert gas introduced under a higher pressure is effective to prevent the very fine particles from entering the monitoring camera, thus preventing the optical path in the partition from being smeared. The second space filled with the inert gas under a lower pressure serves as a thermal buffer zone for thereby preventing the shielding glass panel and the optical path in the partition from being frosted by the heat of the particles. The inert gas under a lower pressure or the thermal buffer zone is also effective in preventing particles from entering the outer sleeve even when the shielding glass panel is broken.

The monitoring camera further includes shutter means for selectively opening and closing the opening. When the partition is broken, the shutter means is closed to prevent the monitoring camera from being damaged by particles which would otherwise enter the monitoring camera. The shutter means has an optical path for the wide-angle lens system and the zoom lens system to prevent particles from entering the monitoring cameras without obstructing the visual observation of the throat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
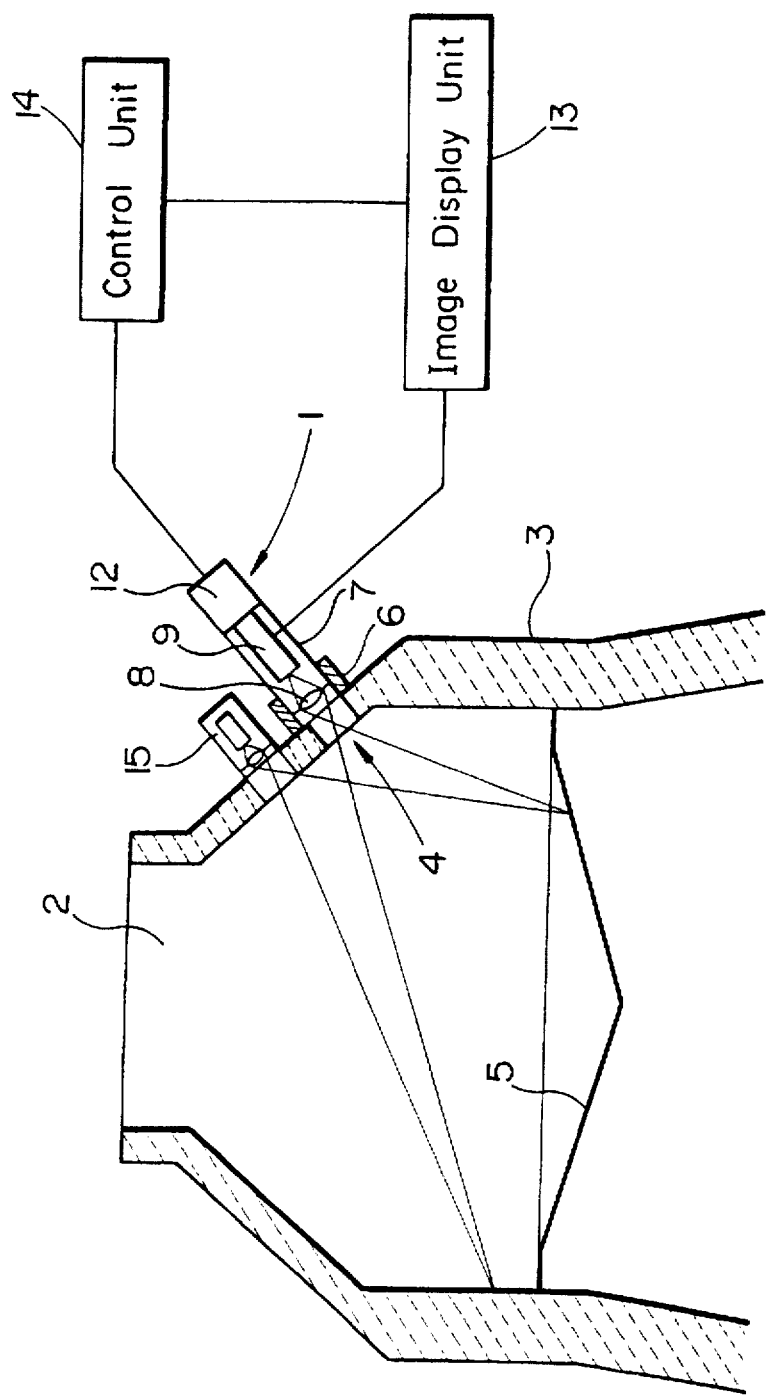
FIG. 1 is a cross-sectional view, partly in block form, of a furnace throat monitoring camera according to the present invention.

As shown in FIG. 1, a furnace throat monitoring camera 1 according to the present invention serves to monitor a stack pattern 5 in a throat 2 of a blast furnace through an opening 4 which is defined in a surrounding wall of the throat 2. The furnace throat monitoring camera 1 includes a cylindrical attachment 6 mounted on an outer surface of the surrounding wall 3, the cylindrical attachment 6 having one end surrounding the opening 4. The furnace throat monitoring camera 1 also has an outer sleeve 7 housing a side-angle lens system 8 secured therein and having an end fitted in the other end of the cylindrical attachment 6. Therefore, the wide-angle lens system 8 is fixed in confronting relation to the surrounding wall 3.

Figure 2:
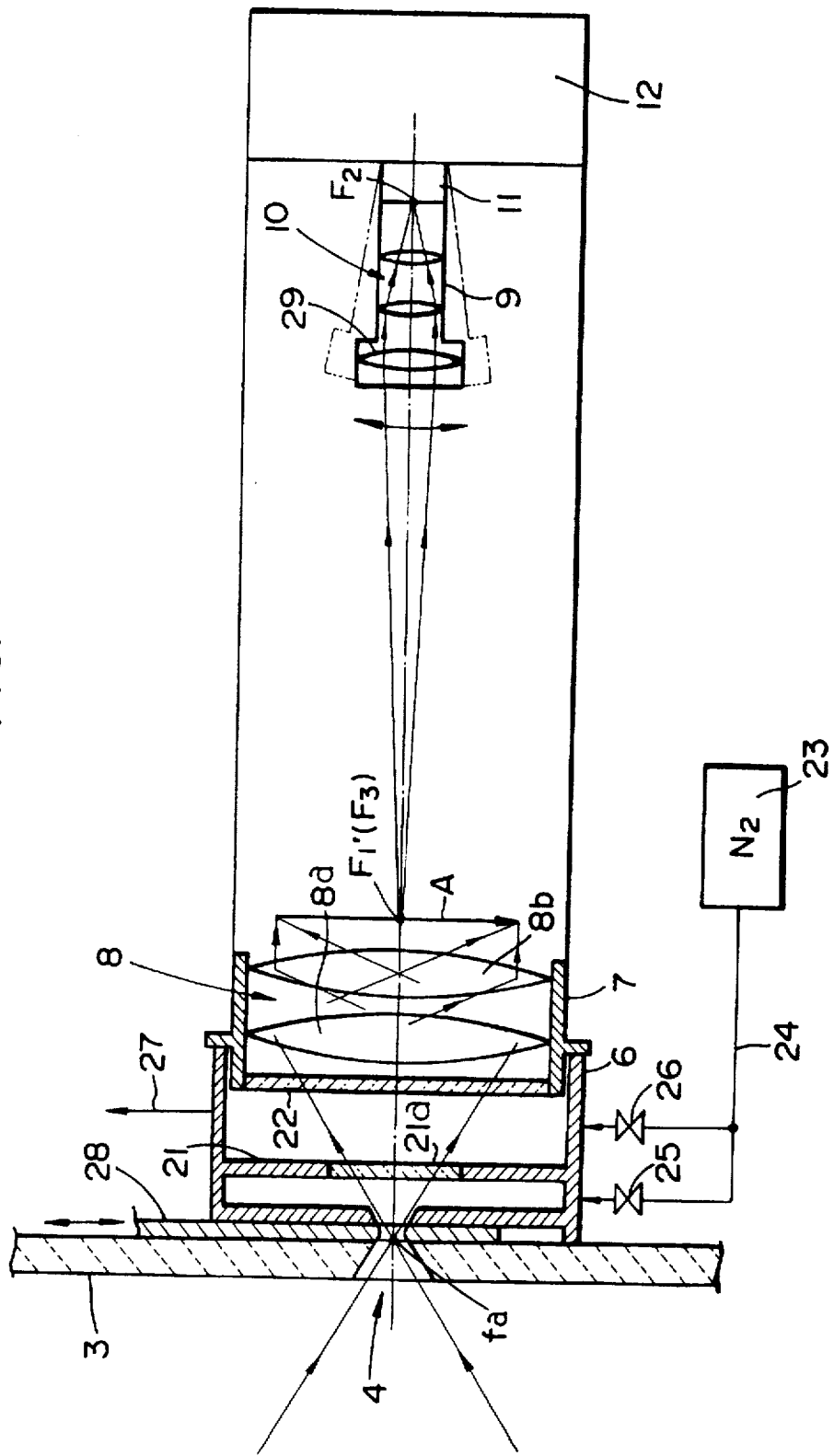
FIG. 2 is an enlarged cross-sectional view of the furnace throat monitoring camera shown in FIG. 1.

A lens barrel 9 is housed in the outer sleeve 7. As shown in FIG. 2, the lens barrel 9 accommodates a zoom lens system 10, an imaging device 11 disposed behind the zoom lens system 10, and a close-up lens 29 disposed in front of the zoom lens system 10.

Normally, the zoom lens system 10 is held on the same optical axis as the wide-angle lens system 8, so that the imaging device 11 can detect an optical image, typically of the stack pattern 5 in the throat 2, produced by the wide-angle lens system 8 through the zoom lens system 10. The lens barrel 9 can be angularly moved by a tilting unit 12 to tilt the zoom lens system 10 in unison with the imaging device 11 for observing any area of the optical image produced by the wide-angle lens system 8.

Specifically, as indicated by the imaginary lines in FIG. 2, the tilting unit 12 can pan the lens barrel 9 to orient the optical axis of the zoom lens system 10 in any direction around the optical axis of the wide-angle lens system 8. In FIG. 2, the lens barrel 9 is shown as being panned about its rear end. However, the lens barrel 9 may be panned in any manner not shown in FIG. 2 insofar as the optical axis of the zoom lens system 10 can be oriented in any direction around the optical axis of the wide-angle lens system 8.

As shown in FIG. 1, the furnace throat monitoring camera 1 is electrically connected to an image display unit 13 and a control unit 14 which is electrically connected to the tilting unit 12. An optical image produced through the wide-angle lens system 8 and the zoom lens system 10 is converted by the imaging device 11 into an electric signal, which is then displayed as a visible image on the display screen of the image display unit 13. The operator of the furnace throat monitoring camera 1 can control the control unit 14 to actuate the tilting unit 12 while viewing the image of the stack pattern 5 displayed on the display screen of the image display unit 13.

The field of view of the furnace throat monitoring camera 1 can be illuminated by an illuminating unit 15 disposed on the surrounding wall 3 above the furnace throat monitoring camera 1.

A detailed structure of the furnace throat monitoring camera 1 will be described below.

As shown in FIG. 2, the cylindrical attachment 6 has a partition 21 extending across the space therein and isolating the interior space of the outer sleeve 7 from the atmosphere in the throat 2 through the opening 4. The partition 21 has a central shielding glass panel 21a fitted therein which serves as an optical path for the wide-angle lens system 8 and the zoom lens system 10. The central shielding glass panel 21a has a thickness of 0.8 cm. The outer sleeve 7 also has a shielding glass panel 22 fitted in an end thereof near the cylindrical attachment 6, the shielding glass panel 22 has a thickness of 1.0 cm. The shielding glass panel 22 may alternatively be positioned closely to the end of the outer sleeve 7 near the cylindrical attachment 6.

Figure 3:
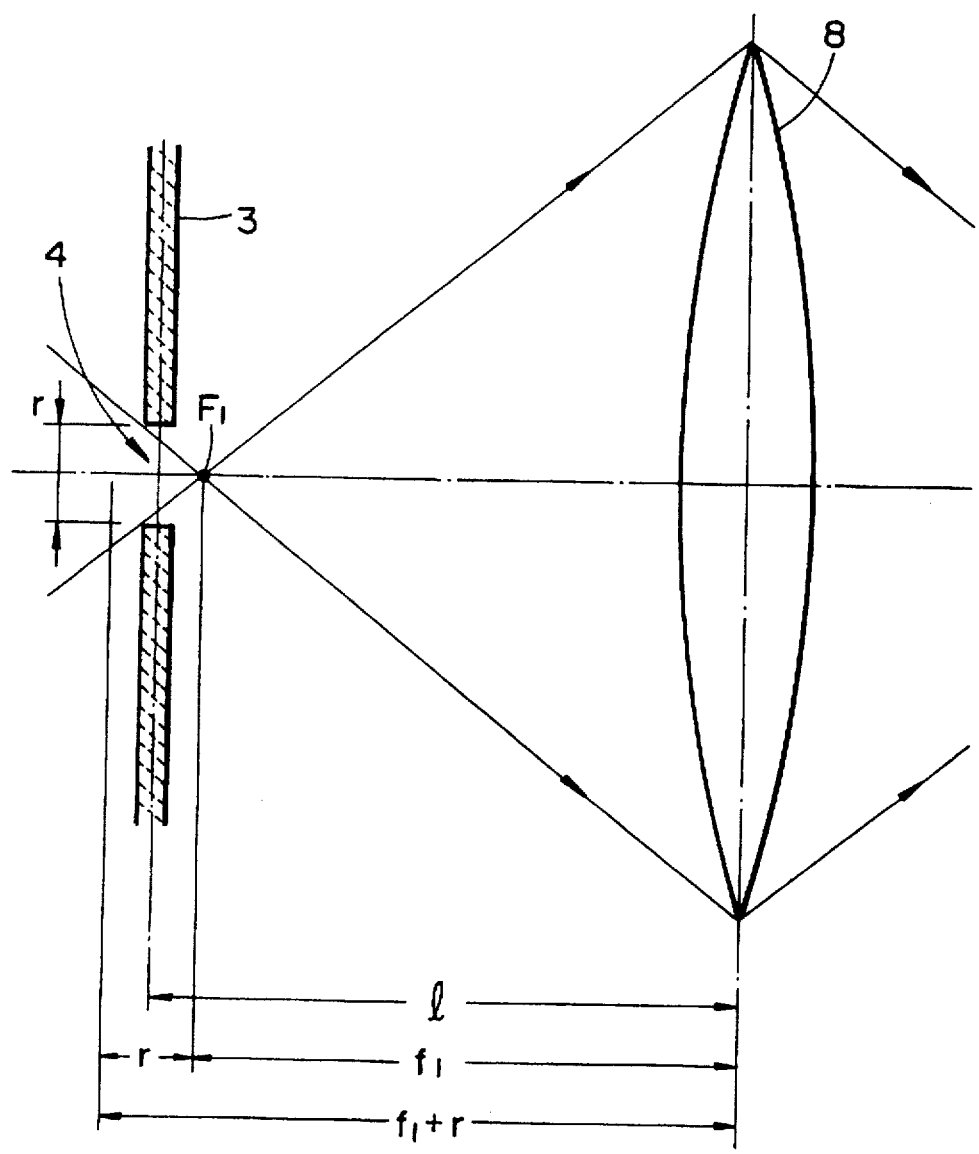
FIG. 3 is an enlarged cross-sectional view showing the positional relationship between an opening and a wide-angle lens system of the furnace throat monitoring camera shown in FIG. 1.
Figure 4:
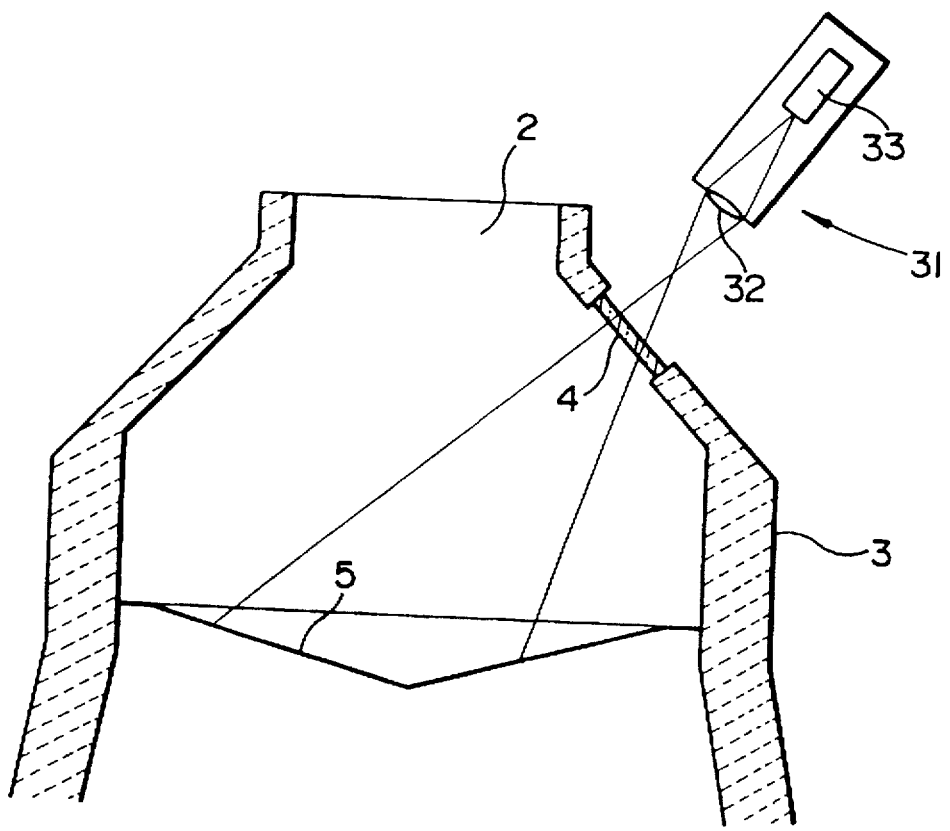
FIG. 4 is a cross-sectional view of a conventional furnace throat monitoring camera.
Figure 5:
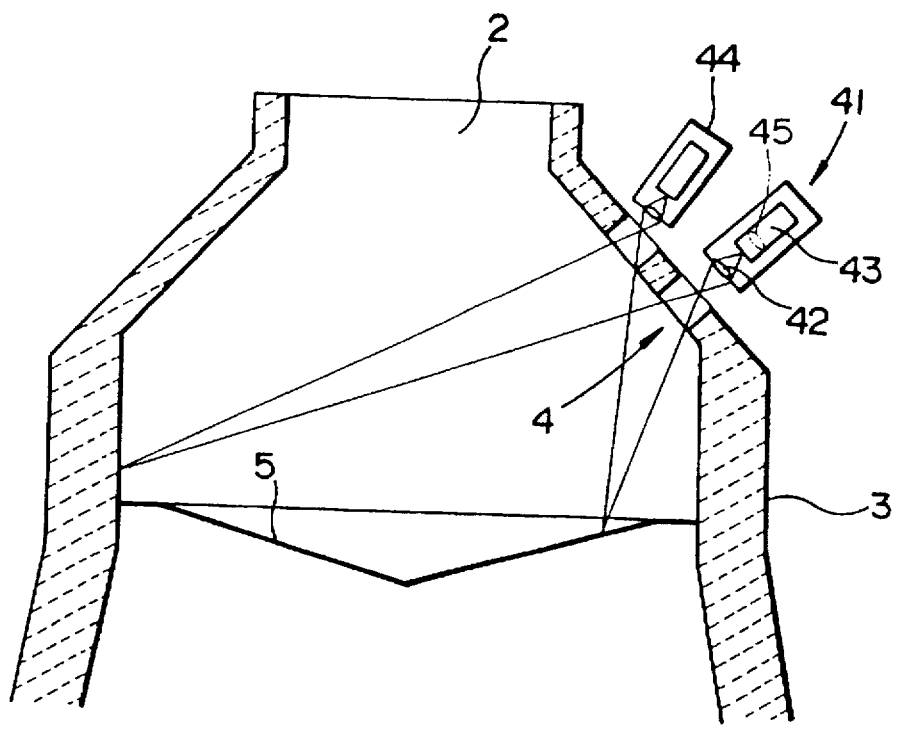
FIG. 5 is a cross-sectional view of another conventional furnace throat monitoring camera.

The wide-angle lens system 8 is fixedly disposed in the outer sleeve 7 behind the shielding glass panel 22. As shown in FIG. 3, the opening 4 is positioned forwardly of a front focal point $F_1$ of the wide-angle lens system 8 within a range whose length corresponds to a minimum width "r" of the opening 4. The opening 4 is in the form of a small hole which is large enough to provide an optical path for incident light that is converged on the front focal point $F_1$. The distance "l" between the center of the opening 4 and the center of the wide-angle lens system 8 lies in the following range:

$f_1 \leq l < f_1 + r$ where r is the minimum width of the opening 4, i.e., the diameter of the small hole as the opening 4, and $f_1$ the front focal distance from the center of the wide-angle lens system 8 to the front focal point $F_1$ thereof.

Since the shielding glass panels 21a, 22 are positioned on the optical axis of the wide-angle lens system 8, the front focal distance $f_1$ should preferably be corrected optically by adding the product of the thicknesses of the shielding glass panels 21a, 22, i.e., 0.8 cm and 1.0 cm, respectively, and the refractive index thereof to the front focal distance $f_1$.

In this embodiment, the wide-angle lens system 8 is composed of plural lenses combined to have an aperture of 150 mm, a front focal length of 9 cm, and a back focal length of 9 cm, the lenses being fixed to the outer sleeve 7, and the distance "l" is the same as the front focal distance $f_1$ of the wide-angle lens system 8, i.e., the distance "l" is 9 cm. While the wide-angle lens system 8 actually comprises a number of lenses to eliminate aberrations, the wide-angle lens system 8 is shown as being composed of two lenses 8a, 8b for illustrative purpose.

The angle of view of the wide-angle lens 8 as it views the throat 2 through the opening 4 is about 80°.

The zoom lens system 10 is spaced 28 cm behind the wide-angle lens system 8. The imaging device 11 is positioned on the back focal point $F_2$ of the zoom lens system 10. The focal length of the zoom lens system 10 is variable from 0.8 to 8 cm. The zoom lens system 10 has a zoom ratio of 8, a maximum angle of view of 43.6°, a minimum angle of view of 4.6°, and a closest imaging distance of 1.2 m. The closest imaging distance is a smallest distance at which a subject can be focused on the back focal point $F_2$ of the zoom lens system 10. No clear image would be produced by the zoom lens system 10 unless the length of the lens barrel 9 would be at least the closest imaging distance. In the illustrated furnace throat monitoring camera 1, the closest imaging distance of the zoom lens system 10 is shortened by the close-up lens 29 having a focal length of 18.8 cm which is positioned in front of the zoom lens system 10.

The close-up lens 29 converts rays of light from a front focal point $F_3$ thereof into parallel rays of light, which enter the zoom lens system 10. Therefore, even though the subject is positioned at a distance smaller than the closest imaging distance of the zoom lens system 10, it can be viewed as being located at a greater distance, as shown in FIG. 2. Therefore, the close-up lens 29 allows the zoom lens system 10 having a closest imaging distance of 1.2 m to function as a zoom lens system having a smaller closest imaging distance, so that the outer sleeve 7 can be shorter than would otherwise be.

A nitrogen gas supplied from an external high-pressure nitrogen gas source 23 through a conduit 24 is depressurized by a valve 25 in the conduit 24, introduced into a space in the cylindrical attachment 6 between the opening 4 and the partition 21, and discharged into the throat 2 through the opening 4. The nitrogen gas as it is discharged into the throat 2 through the opening 4 prevents the atmosphere in the throat 2 from entering the cylindrical attachment 6 for thereby protecting the inside of the furnace throat monitoring camera 1, particularly the shielding glass panel 21a, against being smeared by particles of the iron ore and the coke which are stirred up by the reducing gas flow in the throat 2. The conduit 24 is branched off at a position upstream of the valve 25 and connected to a valve 26 which depressurizes the nitrogen gas to a pressure lower than the nitrogen gas introduced into the space in the cylindrical attachment 6 between the opening 4 and the partition 21 and higher than the atmospheric pressure. The nitrogen gas depressurized by the valve 26 is introduced into a space in the cylindrical attachment 6 between the partition 21 and the shielding gas panel 22. The space thus filled with the nitrogen gas serves as a thermal buffer zone between the space between the opening 4 and the partition 21 and the outer sleeve 7, for thereby preventing the shielding glass panels 21a, 22 from being frosted by the heat of the particles from the throat 2. The thermal buffer zone is also effective in preventing particles from entering the outer sleeve 7 even when the shielding glass panel 21a is broken. The nitrogen gas is discharged from the space between the partition 21 and the shielding glass panel 22 through a discharge pipe 27.

When the shielding glass panel 21a is broken, the shielding glass panel 22 protects the mechanism in the outer sleeve 7. When the shielding glass panel 21a is broken, the pressure in the exhaust pipe 27 is increased. Such an increase in the pressure in the exhaust pipe 27 is detected, causing a cylinder (not shown) to move a slidable shutter 28 between the cylindrical attachment 6 and the surrounding wall 3 for thereby closing the opening 4 to protect the internal mechanism of the furnace throat monitoring camera 1. The shutter 28 has a hole which is held in registry with the opening 4 under normal conditions for maintaining the optical path for the wide-angle lens system 8 and the zoom lens system 10 and permitting the nitrogen gas to flow through the opening 4 into the throat 2.

Operation of the furnace throat monitoring camera 1 will be described below.

Normally, the angle of view of the wide-angle lens system 8 as it views the throat 2 through the opening 4 is about 80°, so that a semicircular or greater range in the throat 2 spaced 10 m forwardly from the wide-angle lens system 8 can be observed. Since the diameter of the semicircular or greater range is:

(10tan40°)×2=16.8 (m), it is assumed that an object having a size of about 16.8 m will be observed by the furnace throat monitoring camera 1. Since the object is sufficiently spaced from the wide-angle lens system 8, the wide-angle lens system 8 focuses an inverted real image A on a back focal point $F_1'$ thereof which is spaced about 9 cm behind the wide-angle lens system 8.

The size of the real image A is determined from the ratio of the back focal length of the wide-angle lens system 8 to the distance to the object as follows:

16.8 (m)×9 (cm)/10(m)=15.1 (cm).

Since the zoom lens system 10 normally has an angle of view of 43.6° and also has the same optical axis as the wide-angle lens system 8, the real image A can be observed by the zoom lens system 10 through the close-up lens 29. At this time, the zoom lens system 10 is positioned 28 cm behind the wide-angle lens system 8, and the real image A is positioned within the closest imaging distance of the zoom lens system 10. With the close-up lens 29 being positioned such that the real image A is focused on the front focal point $F_3$ of the close-up lens 29, the rays of light from the real image A are converted by the close-up lens 29 into parallel rays of light which are applied to the zoom lens system 10. Therefore, the real image A is observed as if it were positioned outside of the closest imaging distance of the zoom lens system 10. As a result, a clear image (not shown) of the real image A produced by the zoom lens system 10 is focused on the imaging device 11, and the full image of the range having a diameter of 16.8 m in the throat 2 is displayed entirely on the display screen of the image display unit 13.

The image display unit 13 has 510 display lines. Consequently, an actual length displayed per display line is:

16.8 (m)/510=33 (mm).

Usually, the human eye can recognize an object corresponding to two display lines on the image display unit 13 with 510 display lines, and can perceive an object having a size of about 66 mm or greater in the throat 2 on the display screen that is 10 m spaced from the throat 2.

For observing an enlarged image of a desired area in the throat 2, the zoom lens system 10 and the imaging device 11 are oriented in a corresponding direction by the tilting unit 12, and the angle of view of the zoom lens 10 is varied.

For example, if the angle of view of the zoom lens 10 is set to 4.6°, the zoom ratio becomes 10, and an area having a size of 1.51 cm, which is about 1/10 of the size of 15.1 cm of the inverted real image A, in the angle of view of about 80° of the wide-angle lens system 8 as it views the throat 2 through the opening 4 is enlarged and displayed entirely on the display screen of the image display unit 13. The displayed area is an area having a diameter of 1.68 m in the throat 2, and corresponds to an angle of view of about 8° as the wide-angle lens system 8 views the throat 2 through the opening 4.

At this time, an actual length displayed per display line is:

1.68 (m)/510=3.3 (mm).

The observer can recognize an object having a size of about 7 mm in the throat 2 on the display screen which is spaced 10 m apart.

A zoom lens system with a fixed optical axis in line with the opening 4 and the wide-angle lens system 8 would enlarge a central area, which is 1/100 of the entire area, of the inverted real image A around the optical axis. However, the zoom lens system 10 according to this embodiment can enlarge the remaining area, which is 99/100 of the entire area, of the inverted real image A around the optical axis because the zoom lens system 10 and the imaging device 11 can be tilted so as to be oriented in a desired direction by the tilting unit 12.

The angle through which the zoom lens system 10 and the imaging device 11 can be tilted may be an angle through which the inverted real image A having a size of 15.1 cm is viewed from the imaging device 11. Since the distance between the imaging device 11 and the inverted real image A is about 21 cm, the angle is given as:

$(\tan^{-1} 7.5/21) \times 2 = 39.5$.

The zoom lens system 10 and the imaging device 11 are thus tilted so as to orient the optical axis of the zoom lens system 10 in any desired direction within a conical space in which the inverted real image A having a size of 15.1 cm is viewed from the imaging device 11.

A detector may be mounted on the lens barrel 9 for detecting two signals representing coordinates (x, y) of the lens barrel 9 within an x-y orthogonal coordinate system lying perpendicularly to the optical axis of the wide-angle lens system 8, the x-y orthogonal coordinate system having an origin on the optical axis of the wide-angle lens system 8. When the zoom lens system 10 and the imaging device 11 are tilted in any desired direction by the tilting unit 12, the signals from the detector are read to determine the direction and angle of titling movement of the zoom lens system 10 and the imaging device 11 toward the coordinates (x, y). Alternatively, signals indicative of an angle and a radial distance from the optical axis of the wide-angle lens system 8 in a circular coordinate system around the optical axis of the wide-angle lens system 8 may be detected from the detector to determine the direction and angle of titling movement of the zoom lens system 10 and the imaging device 11 when they are tilted by the tilting unit 12.

When the zoom lens system 10 and the imaging device 11 are tilted by the tilting unit 12, the observer often tends to fail to recognize which area in the throat 2 is being observed on the display screen of the image display unit 13. To avoid such a drawback, the signals from the above detector may be converted into a value used generally in the operation of blast furnaces, e.g., an angle in a circumferential direction with respect to a hot air main pipe as a reference, or a distance from the center of the blast furnace, and the converted value may be superimposed together with the zoom ratio on the display screen of the image display unit 13.

The converted value is calculated from the two signals detected by the detector based on the height of the imaging device 11 from a height reference of the blast furnace, the height of a struck line of a charged material from the angle at which the imaging device 11 is installed, the angle of rest of the charging material, and the radius of the blast furnace. The inverted real image A contains optical aberrations as it is produced by the wide-angle lens system 8. Such optical aberrations are relatively small at the center of the image, but reach 20% in the peripheral edge of the image. Therefore, the position in the furnace and the image position are calculated while correcting the optical aberrations.

In the above embodiment, the zoom lens system 10 and the imaging device 11 are tilted by the tilting unit 12 to orient the optical axis of the zoom lens system 10 in any desired direction around the optical axis of the wide-angle lens system 8. However, the zoom lens system 10 and the imaging device 11 may be moved vertically and horizontally while keeping the optical axis of the zoom lens system 10 parallel to the optical axis of the wide-angle lens system 8 until the zoom lens system 10 and the imaging device 11 are oriented toward any desired position (x, y) in the x-y orthogonal coordinate system.

In the illustrated embodiment, the zoom lens system 10 has a zoom ratio of 10 with the focal length variable from 0.8 to 8 cm, and the close-up lens 29 with a short focal length is used to fully perform the functions of the zoom lens system 10. However, the close-up lens 29 may have a focal length of 33.3 cm, and the zoom lens system 10 may have a zoom ratio of about 6. According to the present invention, at any rate, a large inverted optical image is produced by a wide-angle lens system of a large aperture, and a maximum magnification ratio for an object to be imaged is determined based on a combination of such an optical image and a zoom lens system having a high magnification ratio. A close-up lens which has a suitable focal length is selected depending on the relative positional relationship between the optical image and the zoom lens system.

The furnace throat monitoring camera 1 may be employed in any of various applications in which any desired area of an optical image produced by the wide-angle lens system 8 is observed through the zoom lens system 10, other than the monitoring of the throat 2 of the blast furnace. For example, the interior of the combustion chamber of a boiler, an incinerator, a heating furnace, or the like may be observed in a wide field of view, and any desired area of the entire field of view may be enlarged through a small hole defined in a hole by a combination of a wide-angle lens system and a zoom lens system which are fixedly mounted on a wall of the combustion chamber. Furthermore, not only a closed space, but also an abnormal condition in a general scene can be observed in a wide field of view, and any desired area of the entire field of view may be enlarged through a small hole defined in a wall by such an optical system combination.

Although a certain preferred embodiment of the present invention has been shown and described in detail, it should be understood that various changes and modifications may be made therein without departing from the scope of the appended claims.

What is claimed is:

1. A monitoring camera for monitoring a condition of a side of a wall through an opening defined in the wall, comprising:

a wide-angle lens system being disposed adjacent to the opening in the wall for producing an optical image;

a zoom lens system for varying a size of the optical image produced by said wide-angle lens system;

a close-up lens operatively positioned between said wide-angle lens and said zoom lens system;

an imaging device for capturing the optical image varied in size by said zoom lens system, said imaging device being disposed adjacent to said zoom lens;

tilting means for angularly moving said close-up lens, said zoom lens system and said imaging device in unison with each other to observe any area of the optical image produced by said wide-angle lens systems;

a cylindrical attachment having one end surrounding said opening;

said close-up lens, said wide-angle lens system, said zoom lens system, and said imaging device being housed in an outer sleeve, said outer sleeve being fitted in an opposite end of said cylindrical attachment closely to said wide-angle lens system; and an inert gas supply means for introducing an inert gas into said cylindrical attachment and discharging at least part of said inert gas through said opening into a throat;

said cylindrical attachment having a partition dividing an interior space thereof into a first space defined between said opening and said partition and a second space defined between said partition and said outer sleeve, said partition having an optical path for said wide-angle lens system and said zoom lens system, said inert gas supply means comprising means for introducing the inert gas under a higher pressure into said first space and then discharging the inert gas through said opening into said throat, and passing the inert gas under a lower pressure through said second space.

2. The monitoring camera according to claim 1, wherein said tilting means comprises means for angularly moving said zoom lens system and said imaging device to orient an optical axis of said zoom lens system in any direction around an optical axis of said wide-angle lens system.

3. The monitoring camera according to claim 1, wherein said opening is positioned forwardly of a front focal point of said wide-angle lens system within a range having a length corresponding to a minimum width of the opening.

4. The monitoring camera according to claim 3, wherein said opening comprises a small hole large enough to maintain an optical path therethrough for incident light converged on said front focal point of said wide-angle lens system.

5. The monitoring camera according to claim 1, and further comprising illuminating means for illuminating said side of the wall.

6. A monitoring camera according to claim 1, further comprising a shielding glass panel mounted on an end of said outer sleeve near said cylindrical attachment or an end of said cylindrical attachment near said outer sleeve, for isolating said wide-angle lens system, said zoom lens system, and said imaging device from a space outside of said outer sleeve.

7. The monitoring camera according to claim 1, wherein said wide-angle lens system has an angle of view ranging from 60° to 80°.

8. The monitoring camera according to claim 1, wherein said zoom lens system has a zoom ratio ranging from 4 to 15.

9. The monitoring camera according to claim 1, used in combination with a blast furnace for producing pig iron from iron ore, for observing a throat of the blast furnace through an opening defined in a surrounding wall of the throat.

10. The monitoring camera according to claim 9, and further comprising shutter means for selectively opening and closing said opening, said shutter means having an optical path for said wide-angle lens system and said zoom lens system.

* * * * *